SELECTIVE INSERTION MACHINE HAVING VARIABLE CAPACITY INSERTION STATION

Original Filed July 14, 1967 2 Sheets-Sheet 1

INVENTORS
EUGENE SATHER
LESTER H. STOCKER
KENNETH A. HAMS

BY Griffin, Branigan & Kindness
ATTORNEYS

INVENTORS
EUGENE SATHER
LESTER H. STOCKER
KENNETH A. HAMS

BY Griffin, Branigan & Kindness
ATTORNEYS 3,570,840

SELECTIVE INSERTION MACHINE HAVING VARIABLE CAPACITY INSERTION STATION

Eugene Washington Sather and Lester H. Stocker, Phillipsburg, N.J., and Kenneth A. Hams, Easton, Pa., assignors to Bell and Howell Company, Phillipsburg, N.J.

Original application July 14, 1967, Ser. No. 657,721, now Patent No. 3,484,100, dated Dec. 16, 1969. Divided and this application July 17, 1969, Ser. No. 859,603
Int. Cl. B65h *39/02*
U.S. Cl. 270—58 1 Claim

ABSTRACT OF THE DISCLOSURE

There is herein disclosed a main document feeding station, a control card feeding station, and a secondary document feeding station which are adapted to selectively place a variable number of matched documents into a single insertion packet on a main feed track which moves the packet past a plurality of conventional insertion stations. The conventional insertion stations add material to the particular packet in accordance with control signals derived from coded indicia on the control card. The main and secondary documents are matched with the control card by means of compare circuits for comparing signals that are sequentially derived from corresponding code indicia on each of the three documents that are to be matched. After the packet is moved past all of the machine's insertion stations, it is passed on to an envelope stuffing station and a postage meter. In this respect, however, the control card may also contain diversion indicia which, when present, are operative to divert a given envelope and its packet so that they are not passed through the postage meter.

CROSS REFERENCE TO RELATED APPLICATION

This is a division of application Ser. No. 657,721 filed July 14, 1967, now Pat. No. 3,484,100.

This invention relates to an improved multi-station insertion machine of the type described in quite some detail in United States Patents 2,325,455 and 3,260,516. Both of these patents relate to multi-station inserters which are presently produced and marketed by the assignee of the present application, and well-known in the market as the Phillipsburg inserters.

In both of the above-noted patents, a master control document is withdrawn from a master control document station and moved onto an inserter track which has a suitable conveyor means for moving the master control document past a plurality of insertion stations. As the master control document is thusly moved, additional documents from the insertion stations are stacked with the master control document. The master control document and its insertions are then inserted into a mailing envelope by well-known means.

Patent 3,260,517 is particularly directed to an improvement of Patent 2,325,455 and related to a device for deriving signals from particular master control documents and using those signals to control the subsequent selective insertion of documents from only selected insertion stations. A still further improvement is described in a co-pending Untied States patent application Ser. No. 605,273 entitled "Insertion Machine Control System" which was filed on Dec. 28, 1966 and is commonly assigned. In that application each master control document that is fed from the inserter's master document station is followed by one or more subordinate documents which are stacked with their master document at the master document station.

In a preferred embodiment of the co-pending application's structure, each master control document or card represents a separate customer; and each of the master control cards is followed by a plurality of subordinate cards, each of which represents a separate purchase by that customer during the month. This requires, however, that the master documents and their subordinate documents be separately collated into an integrated stack prior to their operation in connection with the insertion machine. This does not present too great a problem where all of the subordinate documents are of the same size and shape; or if each subordinate document represents the same type of purchase. As insertion machines have become more sophisticated, however, a need has arisen for insertion machines that are adapted to more efficiently handle variable numbers of different types of subordinate documents for insertion into mailing envelopes with their corresponding master documents. In these instances it is not only time consuming and bothersome to undertake a separate collating step, but where different sizes of documents are involved, it is frequently wholly impractical. It is an object of this invention, therefore, to provide a more efficient insertion machine of this type.

The insertion stations of most insertion machines carry a plurality of insertion items wherein all of the items to be inserted by each particular station are identical. For example, in the case of a telephone company which desires to include a brochure about colored telephones with each customer's bill, one of the insertion stations would contain a large number of these brochures and would insert one with each selected customer's bill. These machines are also easily adapted to have each insertion station insert a plurality of items into each customer's billing packet. These machines are not adapted, however, to have one or more of their individual insertion stations insert a selectively variable number of different documents with a given customer's bill or master card. Hence, it is another object of this invention to provide an insertion machine having one or more insertion stations that are adapted to insert a selectively variable number of items with each customer's bill.

Frequently it becomes desirable to remove a selected customer's mailing packet from the machine's main feed track. For example, each mailing packet in a group usually has about the same weight and therefore requires the same postage. Hence, all of that group's mailing packets can be directed through a preset postage meter. Where a given packet is "off weight," however, it must not be permitted to pass through the postage meter and must be removed from the main feed track. Similarly, it may be desirable to remove the packets of all customers whose bills are delinquent; or perhaps certain envelopes should not be sealed; or, where groups of similarly ZIP coded packets are processed together it might be helpful to single out the last packet of such a group so that the machine can be stopped and some particular attention given to that group of packets. Consequently, it is another object of this invention to provide a means for diverting selected packets of documents from the main feed track so that some particular action may be taken with the thusly diverted documents.

A preferred embodiment of this invention will be described shortly in connection with an insertion machine that is used to mail monthly billing packets to the customers of a telephone company. In that embodiment each customer's packet includes a main bill comprised of one or more call sheets listing, among other things, certain basic charges and each of the toll calls that was made by that customer during the month. In addition, each packet may also include one or more additional charge sheets. These charge sheets are unique to each particular customer and may represent special service charges; credits for previous overcharges; debits for prior underpayments; corrections of prior billing errors; or any one of a host of other special charge or credit items. Still further, depending on the type of customer that is being billed, the billing packet will also include one or more of a selected plurality of general or conventional insertion items which although selectively inserted, are not unique to any particular customer. For example if a customer is known to have teenage children, a brochure on separate telephones might be included; a commercial office might receive a flyer about switchboard telephones; or a restaurant might receive a brochure about the practicality of inserting tlephone jacks at each of its tables. In fact, one recently manufactured machine of this type had twenty such insertion stations whereby each customer's billing packet could contain as many as twenty selected but general insertion items.

In accordance with the principle of the invention, when described in terms of its preferred embodiment, a stack of main and subordinate billing documents for a large number of customers are placed at a first high speed feeding station. This station is adapted to feed all of a given customer's main and subordinate billing documents in a single machine cycle, wherein a machine cycle lasts from the time a billing packet arrives at one station until the time it arrives at the next station. A second station contains a stack of control cards, there being one control card corresponding to each customer. One or more other stations are also equipped with high speed feeders which contain stacks of secondary billing documents such as charge and credit sheets. In this respect, although there is not necessarily a separate charge or credit document corresponding to each customer's main bill, there may also be a plurality of charge or credit documents corresponding to any given customer's main bill. Finally, the machine of the invention also has a plurality of conventional insertion stations and a diversion mechanism. The conventional insertion stations are operative in response to selection signals derived from the control card to selectively insert a fixed number of general items into the billing packets of selected customers. The diversion mechanism is operative in response to selection signals such as from the control card, for example, to divert a given customer's packet away from a postage meter to which each packet is normally directed after passing the conventional insertion stations.

Each customer's main bill contains an identification code field having a plurality of coded identification indicia thereon. Each control card and each secondary document also has a customer identification code field thereon. As each customer's main billing sheet and its subordinate sheets are fed from the main high speed feeder onto a staking station the main billing sheet's customer identification indicia are sensed and a series of customer identification pulses are generated for delivery to a first counter. The coded customer identification indicia on each control card and secondary document are also sensed and give rise to second and third sets of customer identification signals. These three sets of customer identification signals are then suitably compared to determine whether the main bill, the control card, and the secondary documents (if any) are all related to the same customer. If the three sets of indicia signals compare favorably, all of the documents are permitted to proceed along the machine's main insertion track to receive subsequent insertion items prior to being placed into an envelope and either directed to a postage meter or diverted elsewhere. If the three sets of indicia signals do not compare favorably, a suitable error signal is generated and the machine's operation is automatically terminated so that the error can be corrected.

The control document may also contain a second code field having a plurality of coded control indicia thereon for controlling both the subsequent conventional insertion stations as well as the machine's diversion mechanism. Hence, this invention has an additional advantage over the structure described in the above-noted co-pending application. That is, in the structure of the co-pending application, the indicia for selectively controlling the machine's insertion stations are located on a document corresponding to this disclosure's main bill which is included in each customer's mailing packet. Hence, with the co-pending application's structure, the insertion station control indicia must be recorded on each customer's bill for every monthly mailing. In the instant device, however, it is not necessary to include each customer's control card in his billing packet. Hence, the insertion station control indicia are not required to be recorded each time that a particular customer is billed. In this respect, some presently operation embodiments of the invention provide a control card feed for inserting the control document into the billing packet while others do not. Consequently, the machine provides adequate flexibility to meet each individual user's needs.

The foregoing and other objects, features and advantages of this invention will be apparent from the following more particular description of preferred embodiments thereof as illustrated in the accompanying drawings wherein the same reference numerals refer to the same parts throughout the various views. The drawings are not necessarily intended to be to scale, but rather are presented so as to illustrate the principles of the invention in clear form.

Figure 1:
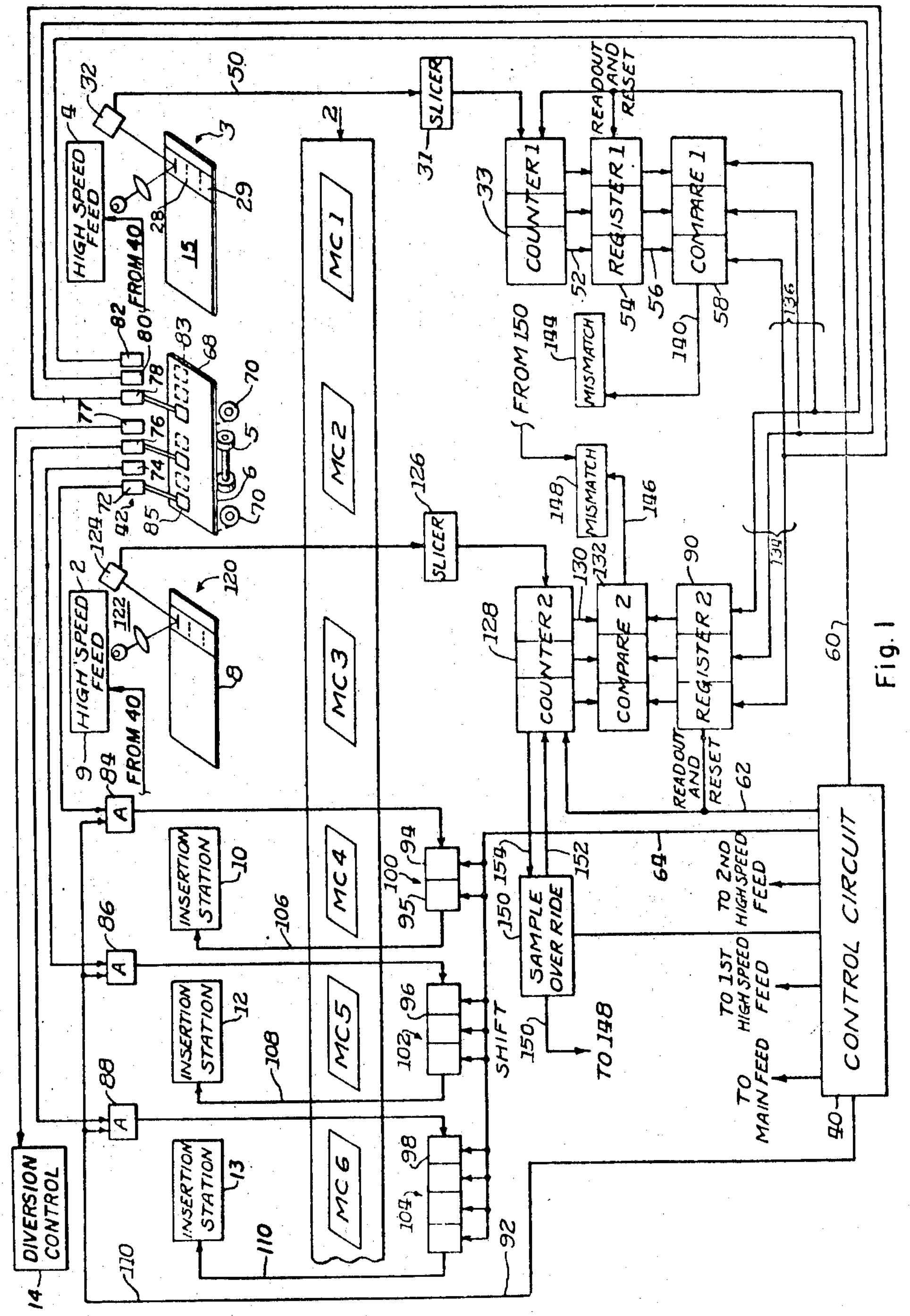
FIG. 1 is a schematic drawing of a preferred structure and circuit arrangement embodying the principles of the invention.

A preferred embodiment of the invention will now be described in connection with FIG. 1. Therein, the insertion machine's main feed track 2 carries documents from a position opposite an intermediate position or stacking station 3 of a high speed feeder 4 past five subsequent insertion stations 6, 8, 10, 12 and 13, as well as a diversion station. The second of these stations (6) is a control card station which may also include an insertion feeding mechanism illustrated by a pair of rollers 5. The next subsequent station (8) is a representative of one or more secondary document stations which also include a high speed feeder 9 adapted to feed all of a given customer's secondary documents in a single machine cycle. The remaining insertion stations (10, 12 and 13) represent conventional insertion structures. The diversion station is operated by a diversion station control 14 and is operative to divert any selected customer's mailing packet away from a postage meter, not shown. The operations of the various insertion stations occur during machine cycles 1 through 6 (MC1–MC6). After passing the last insertion station 13 at MC6, each stack of documents is passed onto an envelope stuffing station, now shown, and then either on to the postage meter or diverted elsewhere, as the case may be.

Figure 2:
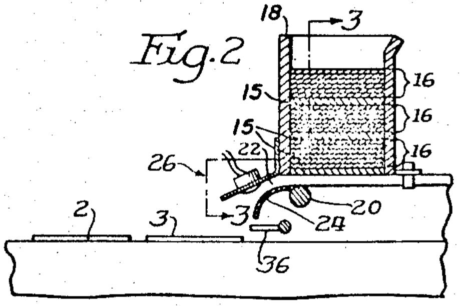
FIG. 2 is a schematic drawing illustrating a side view of a high speed feeder that is suited for use with the invention.
Figure 3:
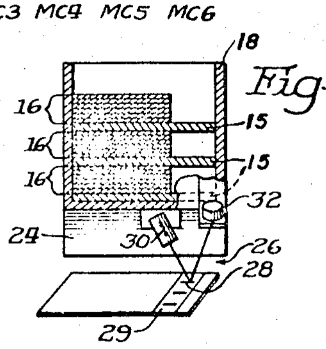
FIG. 3 is a vertical sectional view taken along lines 3—3 of FIG. 2.

FIGS. 2 and 3 illustrate a suitable type of high speed feeder 4 which is adapted to feed each main billing sheet 15 followed by a widely variable number of subordinate billing sheets 16. In one actual preferred embodiment of the invention, the high speed feeder is of the "top feeding" type. That is, it feeds documents from the top of a document stack. The structure and specific operation of the high speed feeder comprises no part of the instant invention, however. Hence, in order to simplify the description, a conventional bottom feeder will only be described very briefly at this time. In this respect, the main and subordinate billing sheets can be contained in a hopper 18 and fed therefrom by means of a suitable selectively operable feed roller 20, or the like. As each document leaves the throat of the hopper, it passes over a guide 24 and under a photoelectric reader 26.

Each main bill 15 has a selected but predetermined number of hyphens 28 located in a field 29 thereof. As each main bill passes under the photocell reader 26, light from the reader's lamp is reflected from the main bill so that a photocell 32 produces a series of output pulses which are delivered through a slicer 31 (FIG. 1) to a first counter circuit 33. As the subordinate bill sheets 16 are fed from the high speed feeder, however, no output pulses are derived from the photocell 32 because the subordinate bills are shorter than the main bills and thereby do not pass under the lamp 30's rays. In this respect, it should be noted that although the main bills are illustrated as being distinguishable from the subordinate bills by virtue of their size, this is not necessarily the case. In one actual embodiment, for example, the main and subordinate bills are of the same size. In that case they are distinguished merely by virtue of the mail bills containing hyphens and the subordinate bills being blank in this respect. For example, when the photocell 32 is responsive to only limited ranges of reflected energy, the main and subordinate bills may be conveniently distinguished by their colors.

Both of the high speed feeders 4 and 9 perform the same functions. Hence, the second will not be further described. It should be appreciated, however, that although a bottom feeder has been disclosed, a top feeder may also be used. In fact, in some cases it might be desirable to provide one of the high speed feeding stations with a top feeder and the other with a bottom feeder. Both high speed feeds as well as the main feed are controlled by a control circuit 40. A suitable control circuit of this general type is disclosed in detail in the above noted co-pending application on an Insertion Machine Control System. That application only deals with a single high speed feeder, but its principles can easily be extended to cover a second. Specifically, that application discloses a control system for controlling both a high speed feeder and a main feed as well as the machine's insertion stations by means of an electronic counter as it operates in response to outputs from a scanning photocell system similar to that just described in connection with photocell 32. That is, once the high speed feeder is put into operation it sequentially feeds both a main document and its subsequent subordinate documents. As soon as the next main document passes under the photocell reader, but before it is deposited at the intermediate position 3, the photocell pulses the counter and the high speed feeder is stopped. In the meanwhile, the main feed track carries preceding document stacks to a position opposite their next insertion stations.

If there are more subordinate documents than can be fed during the time required for the stacks to move from one station to another, the main feed track is stopped and the high speed feed is permitted to continue. If, on the other hand, the next main document is fed from the high speed feeder before the completion of a machine cycle, then the counter stops the high speed feeder and permits the main insertion track feed to continue.

In the co-pending application, each of the photocell's pulses to the counter are stored to selectively control subsequent operations of selected insertion stations. As will be described in more detail shortly, however, the instant device differs from that of the co-pending application in that the conventional insertion stations 10, 12 and 13 are more directly controlled by means of pulses received from a reading assembly 42 located at the control card station 6.

Returning to the instant invention; after each main bill 15 and its subordinate billing sheets 16 are deposited at the intermediate position 3, they are fed onto the insertion machine's main insertion feed track 2 by means of a suitable secondary feeding mechanism which is illustrated schematically as 36 in FIG. 2. After this stack of documents is thusly fed onto the main feed track, it is sequentially moved past the control card station 6; the secondary document's high speed feeding, stacking, and insertion station 8; and on past the three conventional insertion stations 10–13 to the diversion station and postage meter. As noted, the time between a stack's arrival at one station until its arrival at the next is referred to as one machine cycle (MC). Hence, if a stack is placed onto the main feed track at machine cycle 1 (MC1 in FIG. 1), it reaches conventional insertion station 13 five machine cycles later at machine cycle 6 (MC6).

It should be carefully noted that although the stack's actual moving time extends over a fixed duration, there may be intervals during which the main feed track is stationary. Moreover, these intervals are not necessarily equal, but vary depending upon the variable number of subordinate documents that follow their related main documents out of the high speed feeders. This aspect of the insertion machine being described is more fully set forth in the above noted co-pending application Ser. No. 605,273. Briefly, however, the main feed track 2 is controlled by a clutch and brake system. For example, assume that a given customer's mailing packet is to receive 25 or so inserts from one of the high speed feeders. After that high speed feeder has few 6 or 8 inserts (or whatever number would be fed during a "normal" machine cycle), the main feed's brake is applied, its clutch released, and the main feed track halted for a few seconds until each of the high speed feeder's inserts has been fed. The brake is then released, the clutch engaged, and the next machine cycle is started. In this manner any given machine cycle may have a duration of from about a fraction of a second to two or three seconds or so.

Returning now to FIG. 1 and noting that this preferred embodiment shall be described in connection with the above example of a telephone company billing system; each customer's main billing sheet as well as any subordinate billing sheets are sequentially fed from the high speed feeder 4 onto the stacking station 3. Each customer's main bill carries a series of hyphens or other indicia in its field 29. As will be appreciated more fully later, these hyphens may be arranged in any suitable code. For example, each of the telephone company's customers may be represented by a particular code; or if the company's customers are broken down into smaller groups such as normally occurs where a different group of customers is billed on a specific billing date in each month, each customer within a given group may have unique code, but the same code system may be repeated with each group. In what is perhaps the simplest case, each of the company's customers will be assigned a billing code number of between 1 to 10 or so. In this manner, by arranging all of the customer's bills in random groups, each of which is arranged in increasing numeric order from 1–10, a missing main bill or secondary document can be detected merely by determining whether every tenth bill bears code indicia representing a 1. Similarly, with reasonable accuracy a check can be made to see if a main document has the desired correspondence with a secondary document by checking to see if they both carry the same customer digit, even though the same digit may also be assigned to many other customers. Obviously, many other types of coding schemes can be used. In fact, for purposes of simplicity, this preferred embodiment shall be described in terms of a telephone company's customers main bill has only a single hyphen 28 in its field 29; the next customer's main bill has two hyphens; and the third customers have their main bills similary marked. That is, the fourth customer's bill has one hyphen; the fifth, two; the sixth, three and so on.

The output pulses from the photocell 32 are delivered on line 50 through a slicer 31 to a first counter 33. The slicer 31 acts as a threshold or weighing circuit to pass only those of the photocells' output pulses that are produced in response to hyphens 28 on the document's field 29. The counter 33 may be of any one of several conventional types depending, among other things, upon the type of hyphen code that is used with each customer's main bill. One suitable type of counter is more fully described in a second co-pending application entitled "Counter Circuit." That application has a Ser. No. 605,477, was filed on Dec. 28, 1966, and is commonly assigned. The various stages of the counter have outputs on lines 52 to a first storage register 54 whose output, in turn is delivered on lines 56 to a first comparison circuit 58. In this embodiment, the first counter 33 and the first storage register 54 are of the type that are "read out" upon receipt of a shift signal which is generated at a suitable time by the control circuit 40. That is, the control circuit 40 generates variously timed shift pulses on lines 60, 62 and 64. In this respect, at the end of each machine cycle a shift pulse is delivered on line 60 to the first counter 33 so that its contents are read out into the storage register 54. Another shift signal from the control circuit 40 causes the contents of the first storage register 54 to be read out into the first compare circuit 58.

The control card station 6 is equipped with a suitable mechanism, not shown, for delivering control cards 68 in seriatim to a suitable position so that each control card can be read by the reading assembly 42. The reading assembly is comprised of a plurality of lamps 70 located below the control card and a series of photocells 72–82 located above the control card 68. In these respects it should be appreciated that, although a photoelectric detecting system is indicated for use in connection with the master card 68, a brush sensing type of system could also be employed. Similarly, although only two lamps and two groups of three photocells are shown, this is only for purposes of simplicity, it being understood that various other combinations could be employed equally as well. In large part, the type of sensing arrangement employed depends upon the type of code and the type of control medium that is used. For example, if the control medium is a card carrying printed hyphen's as its code indicia, a reflective sensing system could be conveniently employed.

In this embodiment, it is contemplated that the control card be of the punched hole variety so that when a control card 68 is located above the lamps 70 the light passing through the groups of holes 83 and 85 thereof impinges upon the respective photocells each of which thereby produces an output pulse. The output pulse from photocells 72, 74, and 76 are delivered to the diversion station control 14; and the outputs from photocells 78, 80 and 82 are delivered to appropriate stages of both the first compare circuit 58 and a second storage register 90. In one actual embodiment the control card also contains suitable indicia for controlling the second high speed feeder. For purposes of simplicity, however, that aspect of the machine's control system is broadly described as being included within the control circuit 40.

The gating circuits 84–88 have second inputs from the control circuit 40 on line 92. These inputs are operative to gate the signals from photocells 72–76 to the first stages 94, 96, and 98, respectively of shift registers 100, 102 and 104, also respectively. As shown in FIG. 1, the first shift register 100 has two stages; the second shift register 102 has three stages; and the third shift register 104 has four stages. The output stages of these three shift registers are connected by lines 106, 108 and 110 to the insertion mechanisms of the three conventional insertion stations 10, 12 and 14 as shown.

As noted above, light from the lamps 70 also passes through the group of holes 83. These holes are present or not depending upon the particular card's customer identification code with corresponds exactly to the customer code on the same customer's main bill.

The second high speed feeder is substantially identical with the first high speed feeder and therefore will not be further described in detail. This high speed feeder functions to feed secondary documents to a stacking station 120 beneath a reflective reading system 122 which is also substantially identical with that described in connection with the first high speed feeder and therefore has a corresponding photocell 124. As noted above these secondary documents may be comprised of supplemental credit or charge sheets for items that are not contained on either the customer's main bill or subordinate billing documents. In contrast, the secondary documents might represent such charges as installation of a new color telephone; director advertising; credits for prior overcharges; or perhaps merely a statement of past due bills. In any event at least the first of each customer's secondary documents has marked thereon a hyphen code which corresponds to both the hyphen code on that customer's main bill as well as the customer code on the control document.

As each of the secondary documents passes under the reflective sensing mechanism 122 the pulses from the photocells 124 are derived from the document's hyphens and passed through a second slicer or threshold circuit 126 to a second multistage counter 128. Upon receipt of a shift pulse from the control register on line 62 the stages of the second counter 128 are read out on lines 130 to a second compare circuit 132.

As the customer code on each of the control cards 68 is sensed by the photocells 78–82 the pulses from these photocells are delivered on two groups of lines 134 and 136 to both the second storage register 90 and the first compare circuit 58. At the same time pulses from photocell 77 are delivered to the diversion station control 14. Upon receipt of a shift pulse on line 62 from the control circuit 40, the counter 128 and the second storage register 90 have the various stages thereof read into the second compare circuit 132.

Having described the structure of a preferred embodiment of the invention as it is employed in connection with a telephone company's billing system, the operation of the device will not be described. In this respect, assume that all of the various register stages are in their no voltage or OFF states. Assume further that a first main bill has passed under the first high speed feeder's photocell reader and has been placed at the stacking station 3. As shown in the figure this particular customer's main bill carries only one hyphen, the other two hyphen positions being merely illustrated as dotted lines in the figures. Hence, the photocell 32 only delivers one pulse on line 50 to slicer 31 which passed only one pulse to the counter 33. Consequently, at time MC1 the first stage of counter 33 is turned on at line 1 of FIG. 4. The various stages of the remaining registers are all OFF at this time. When all of the main bill's subordinate documents have been fed the first main stack is fed onto the main insertion track 2 as described above. During the second machine cycle the first master stack is moved toward its position opposite the control card station 6; the second main bill is fed under the first high speed feeder's reflective sensing mechanism; and the first control card 68 is passed into its reading position as shown.

In accordance with the particular coding scheme that is employed with this embodiment of the invention, the second main bill, although not specifically illustrated, would have two hyphens placed thereon whereby the photocell 32's output derived from that bill would place both the first and second stages of the first counter 33 ON. Just prior to that time, however, the counter circuit 33 received a shift pulse from the control circuit on line 60 whereby the counter circuit 33 was read out into the storage register 54 to turn on its first stage as indicated at line 4 of FIG. 4. Also during the second machine cycle, light from lamp 70 is permitted to pass through the first hole of the control card's customer coding field so as to cause photocell 78 to produce an output which is delivered to the first stages of the compare circuit 58 and the second storage register 90. This causes the first stage of the second storage register 90 to be turned on as shown on line 7 of FIG. 4.

The first compare circuit 58 is of the type that only produces an output pulse if its two simultaneous inputs are different. Hence, because its input from the first storage register 54 and its input from the master card photocell 78 are the same, there is no output from the compare circuit 58 as shown on line 10 of FIG. 4. If, either a customer's main bill or his master card had for some reason been out of order or missing, the two inputs to the compare circuit would have been different whereby the compare circuit would have produced an output as shown by the dotted signal on line 10 of FIG. 4. Such an output would have been delivered on line 140 of FIG. 1 to a mismatch alarm 144. Note in this respect that in the actual embodiment of this device the output signal from the compare circuit 58 to the mismatch alarm 144 is suitably gated by the control circuit 40 to preclude the generation of error signals that might be caused by slight timing variations between the first compare circuit 58's receipt of signals from the first storage register 54 and the control card photocell readers 78–82. For purposes of simplicity, however, a suitable delay of this type has not been illustrated herein. Similarly, there would be suitable delays between the time that the first storage register 34 is reset and the time that the first counter 33 is read out. These and similar other delays will be quite apparent to those skilled in the art, however, and therefore will not be further noted.

Also during the second machine cycle, light is permitted to pass through the control card's first and second insertion machine control holes as illustrated in FIG. 1, so as to energize the first and third photocells 72 and 76 which send signals to AND gates 84 and 88, respectively. Upon receipt of a timely signal on line 92 from control circuit 40, therefore, the AND gates 84 and 88 pass the photocell signals to the first stages 94 and 98, respectively, of the shift registers 100 and 104, also respectively. The condition of these shift register stages are indicated at lines 11 and 14 of FIG. 4.

In the illustrated embodiment the control card 68 does not contain a hole through which light can pass to activate the photocell 77. Were such a hole present, however, a pulse would also be delivered to the diversion station control 14. To simplify the description of the invention, the diversion control 14 is not described in detail. As noted above, however, it is operative to divert a given customer's document packet off of the main feed track so that it is not passed onto the postage meter. The diversion control includes a suitable shift register and gating circuit to insure that the proper customer's packet is diverted at the proper time. The number of diversion control register stages varies of course with the number of machine cycles required to move a customer's packet from the control card station to the diversion station; and this in turn depends upon the number of the particular machines insertion stations. In view of the above and following description, suitable details of this type will be apparent to a man skilled in the art. Hence, they will not be further described at this time.

During the next machine cycle the various registers are read out and reset or shifted as the case may be; the first main bill is passed onto its position opposite the secondary document station 8; the second main bill is moved in front of the control station 6; the third main bill is fed to the stacking station 3; the second control card is fed to its position under the control card reading assembly 42 at control card station 6; and the first customer's secondary documents correspond to the first main bill are fed onto the stacking station 120.

Figure 4:
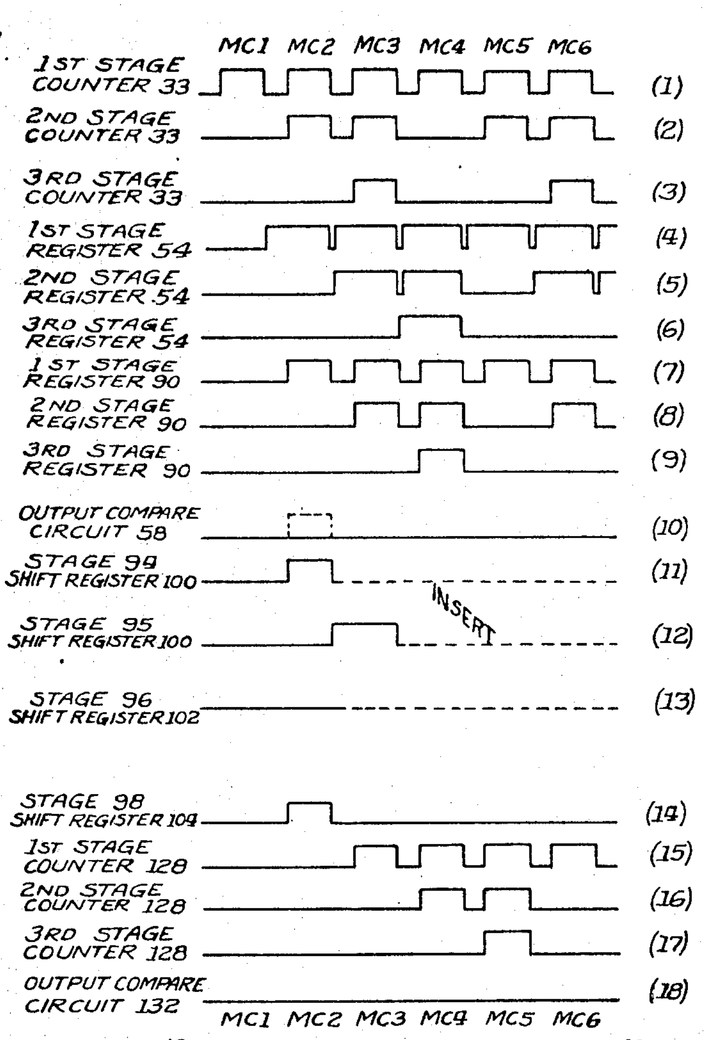
FIG. 4 is a timing diagram illustrating various voltage level changes in certain of the FIG. 1 structure's components. This figure is used to describe the structure's various timing relationships as an illustrative customer's billing packet if formed by the apparatus of the invention.

As soon as the single hyphen on the first customer's secondary document is sensed by the photocell 124 it produces an output to the slicer 126 which enters a single pulse into the counter 128 to thereby energize the counter 128's first stage as shown at MC3 on line 15 of FIG. 4. At substantially the same time, however, the register 90 is rea dout into the compare circuit 132. That is, the single pulse that was placed into the first stage of register 90 during MC2 (line 7) is shifted into the compare circuit 132 where it is compared with the MC3 signal from the first stage of counter 128. Hence, there is no output from the second compare circuit 132 on line 146 in FIG. 1 to a second mismatch alarm 148 (see also line 18 of FIG. 4). At the same time (MC3) the signals in the first stages 94 and 98 of the shift registers 100 and 104, respectively, were shifted into the second stages thereof as is shown on line 12 of FIG. 4 with respect to the second stage 95 of the first shift register 100.

During the machine cycle 4, new documents are moved onto the stacking stations 3 and 120 as well as under the control card reading assembly 42 while the first customer's bill is moved to a position opposite the first conventional insertion station 10. At this time, a suitably delayed shift pulse on line 64 from the control circuit 40 causes the signal in the second stage 95 of the shift register 100 to be passed along line 106 to the insertion mechanism of the first conventional insertion station 10 whereby the selected material is inserted with the first customer's billing packet. This is noted on lines 12 and 13 at MC4 of FIG. 4.

The remaining cycles of the insertion machine progress in the same manner as described above. If at any time during any of the cycles there is a mismatch between a main bill and either a corresponding control card or a secondary document, an appropriate one of the mismatch alarms 144 or 148 is energized. That is, if a mismatch occurs between a customer's main bill and the control card the mismatch alarm 144 is energized. Similarly, if a mismatch occurs between a control card and a customer's secondary documents, the mismatch alarm 148 is energized. It should be appreciated in this respect that if the mismatch alarm signal from 144 is delayed for one machine cycle and ANDed with the mismatch alarm signal from 148, a resulting output from the AND gate would indicate that, it was the control card that was causing the error.

It should also be noted that, if desired, the control card can be inserted onto the insert track with the corresponding main bill. One of the advantages of the structure of the invention, however, is that a given customer's control card may be saved from month to month thereby obviating the necessity for marking insertion station selections on each main bill every month. If it is found desirable to include the control cards with the main bills, however, such as would occur where the customers are requested to return the control card with their payment, the control cards can be delivered to stacking stations and inserted onto the insert track in the same manner as has been described for the main bills and secondary documents.

Similarly, the invention has been described as though each main bill has a corresponding secondary master document. This is not necessarily the case, however. For this reason a sample override circuit 150 is included to preclude the generation of a mismatch signal in the event a particular customer has no secondary documents.

Just prior to the time that counter 128 is read out by a signal on line 62, the control circuit 40 also triggers circuit 150 to sample the counter by means of appropriate signals on lines 152 and 154. If none of the counter 128's stages are on, thereby indicating that there were no secondary documents read, circuit 150 sends an overide signal on line 156 to disable the mismatch alarm 148. This supplemental system might also include misfeed detection circuits at the secondary document station. Misfeed devices are common, however, and will not be further described.

It will also be appreciated by those skilled in the art that although the invention has been described in specific terms, various other modifications are equally within the scope of the invention. For example, the number of conventional insertion stations is almost limitless; and a plurality of high speed secondary document insertion stations may easily be included. In this respect a preliminary matching operation can be conducted between various groups of secondary documents. For example, at the same time that a given main document is placed at its stacking station 3, a plurality of secondary documents can be matched among themselves. In this manner, when the particular main document arrives at its position opposite the secondary document insertion station, the various secondary documents will already have been matched among themselves so that only a single matching operation is required between the entire group of secondary documents and the main document. The advantage of this alternative is merely that the matching operations for all of the main and subordinate documents occur simultaneously and can therefore be accomplished in a shorter time.

In any event, the above described structure provides a machine having an insertion station which, by virtue of its high speed and an associated code sensing and comparison system, is adapted to insert a variable number of specifically related secondary documents with a specific main document. This is in contrast to the machine's conventional insertion stations which, although selectively operable, are not adapted to insert a variable number of specific items with specific master documents. Instead, the conventional insertion stations merely insert one of a group of identical items at selected times, there being no specific correspondence between the time and a particular item.

In addition, the insertion machine of the invention does not require advance collation of all of the mailing packet items that are uniquely related to a particular customer. The advantage of this should be well appreciated when considered in connection with the above example of a telephone company's billing system. That is, each customer's monthly service charges and toll call fees are generally recorded on the customer's main bill at a first of the company's locations. The credits and charges that are recorded on that customer's secondary documents, however, are frequently originated at another of the company's location, such as at a field service center or an urban show room, for example. Hence, it is frequently impractical to bring all of these documents together prior to the monthly billing operation whereby a pre-collating operation is often quite impractical.

Moreover, as noted above, the structure just described does not require that each customer's monthly bill be marked with an insertion station selection code. That is, by including a separate control card station for reading a control card corresponding to each customer's main bill, and using that control card to control insertion station selection, the monthly marking of insertion station selection codes is avoided merely by retaining the control card for subsequent use. The invention, therefore, is quite flexible because it permits both the retention of the control card, or, if the insertion station selection coding operation is not too important to a particular user, the control card can be inserted and mailed along with each customer's bill.

While the invention has been particularly shown and described with reference to a preferred embodiment thereof, it will be understood by those skilled in the art that various changes in form and details may be made therein without departing from the spirit and scope of the invention. For example, although the invention has been described in terms of the control document being a unit record card having punched holes therein, the invention is equally as applicable to a card having magnetically coded indicia thereon or indeed it is not necessary that the master document be a card at all. That is, in some applications a suitably coded paper or magnetic tape or the like might be a satisfactory equivalent.

The embodiments of the invention in which an exclusive property or privilege is claimed are defined as follows:

1. In an insertion machine of the type in which an insertion track moves groups of documents past a different one of a plurality of insertion stations during each machine cycle and said insertion stations are adapted to add material to said groups, the improvement comprising:

a diversion means for diverting selected groups of documents from said main feed track; at least one document in each of said groups having control indicia thereon and adapted to contain diversion control indicia;

diversion control sensing means for sensing the presence of diversion control indicia on said document constraining said control indicia and generating a diversion control signal in response thereto; and means for delivering said diversion control signal to said diversion means which is operative in response to receipt of said diversion control signal to divert the associated document group from said main feed track.

References Cited

UNITED STATES PATENTS

| | | | |
|---|---|---|---|
| 3,168,306 | 2/1965 | Harrison, Jr. | 270—58 |
| 3,260,517 | 7/1966 | Sather | 270—58 |
| 3,276,767 | 10/1966 | Stephan | 270—58 |

ROBERT W. MICHELL, Primary Examiner

P. V. WILLIAMS, Assistant Examiner